United States Patent [19]

Sasao et al.

[11] Patent Number: 4,651,926

[45] Date of Patent: Mar. 24, 1987

[54] FUEL INJECTION VALVE HAVING A BURNISHED GUIDE BORE AND SEAT

[75] Inventors: Isamu Sasao, Kakuda; Yoshiyasu Takaoka, Urawa, both of Japan

[73] Assignee: Honda Giken Kogyo Kabushiki Kaisa, Toyko, Japan

[21] Appl. No.: 673,500

[22] Filed: Nov. 20, 1984

[30] Foreign Application Priority Data

Nov. 30, 1983 [JP] Japan ................................ 58-224406

[51] Int. Cl.[4] ...................... B05B 15/06; B21C 37/30; B23P 15/04; B23P 15/26

[52] U.S. Cl. .................................. 239/585; 29/157 C; 29/557; 29/90 R; 29/DIG. 19

[58] Field of Search .................... 239/585.5; 29/157 C, 29/DIG. 19, 557, 90 R

[56] References Cited

U.S. PATENT DOCUMENTS 2,618,989 11/1952 Cupler, II ........................ 29/157 C 3,069,750 12/1962 Koppelmann ...................... 29/90 R 4,385,339 5/1983 Takada et al. ...................... 239/585

*Primary Examiner*—Joseph F. Peters, Jr.

*Assistant Examiner*—Patrick N. Burkhart

*Attorney, Agent, or Firm*—Roberts, Spiecens & Cohen

[57] ABSTRACT

A fuel injection valve comprising a main fuel injection valve body containing an electromagnetic coil which is operative to displace a movable core having a valve rod attached to the core. The valve rod has an end with a valve body adapted to selectively engage a valve seat-forming member attached to the valve body. The valve seat-forming member has an interior including a guide bore for guiding opening and closing displacement movements of the valve rod. The guide bore has a uniform diameter throughout its entire length and is connected to a valve seat formed at the end of the guide bore in continuation thereof. A fuel discharge port is formed in continuation of the valve seat. The guide bore is straight and has a burnished surface and the valve seat also has a burnished surface for contact by the valve body. The guide bore is connected to the valve seat without any undercut and due to the burnishing, the guide bore and valve seat are connected without flashing.

8 Claims, 3 Drawing Figures

FUEL INJECTION VALVE HAVING A BURNISHED GUIDE BORE AND SEAT

FIELD OF THE INVENTION

This invention relates to a fuel injection valve which includes a main fuel injection valve body, a movable core attracted magnetically towards a fixed core by an electromagnetic coil disposed within the main fuel injection valve body, a valve rod attached to the movable core and having an end with a valve body formed at the end, and a valve seat-forming member attached to the end of the main body with the valve rod inserted therein.

More specifically, the present invention relates to a fuel injection valve of the above type which is suitable for an electronic fuel injection device.

BACKGROUND

Referring to FIG. 1 which shows a construction known in the art, therein it is seen that the valve seat-forming member of a fuel injection valve of the described type includes a guide bore b for the guiding of opening and closing displacement movements of the valve rod, a valve seat c formed at the end of the guide bore b in continuation from the guide bore, and a fuel discharge port d in continuation from the valve seat c. In this construction, it is the customary practice to polish a bore b' bored in a blank of a valve seat forming member a, and to polish a bore c' in the valve seat c in order to form the guide bore b and a seat surface e of the valve seat c. In greater detail, the bore b' is polished by a grinding tool f that is moved around an axis of rotation $l_1$ aligned with the axis of the guide bore b, while, rotating the tool about its own axis of rotation $l_2$ which is parallel to the axis of rotation $l_1$. The seat surface e of the valve seat c is polished by a grinding tool which has a different shape from that of the grinding tool f.

This method produces the following problems:

1. The polishing finish requires a relatively large thickness or margin D for polishing. Therefore if an error, even slight, occurs in the mounting position of the grinding tool f, for example, due to displacement in the position of the axis of rotation $l_2$ from the axis of rotation $l_1$, the guide bore b can not be polished and finished uniformly.

2. The tip of the grinding tool f is easily worn so that it can produce a sharp flashing or edge g at the gude bore b i.e. at the juncture of the guide bore b and the seat c. The flashing g has a width corresponding to the extent of the polishing margin D. In order to prevent the formation of the flashing or edge g, an undercut escape groove h must be formed in advance by cutting into the end of the bore b'; however, this is difficult to do.

3. The escape groove h forms, in turn, a fuel trap within the valve seat-forming member a causing a drop in the fuel velocity which has an adverse influence on the fuel injection.

4. In connection with problem (2) above, if the swarf produced when cutting the escape groove h remains, it can choke the fuel discharge port d or cause fuel leakage. To remove the swarf, thorough cleaning must be effected, but it is extremely difficult to completely remove the swarf. This leads to marked variations in the fuel injection quantity and performance.

SUMMARY OF THE INVENTION

An object of the invention is to provide a fuel injection valve in which the above-noted problems are eliminated and in particular which makes the cutting of the escape groove unnecessary, by employing burnishing instead of polishing to finish the guide bore. This improves producibility and provides a stable fuel injection valve free of any variations in fuel injection characteristics.

More particularly, the guide bore is formed in the valve seat-forming member so as to have a uniform diameter throughout its entire length and the guide bore is straight and has a burnished surface over substantially its entire length.

In further accordance with the invention, the valve seat is also formed with a burnished surface and preferably the guide bore and valve seat are formed with their respective burnished surfaces by means of a common tool and concurrently.

The invention further provides that the guide bore is connected to the valve seat without any undercut as is normally required in the prior art.

In accordance with a feature of the invention, the burnished guide bore and the burnished valve seat are connected without any intermediate flashing.

In further accordance with the invention, the valve seat-forming member has a non-burnished portion between the burnished bore and the burnished valve seat. The non-burnished portion is formed by restricting contact of the burnishing tool with the starting bore such that the non-burnished portion projects only slightly inwards relative to the burnished bore.

DETAILED DESCRIPTION

Figure 2:
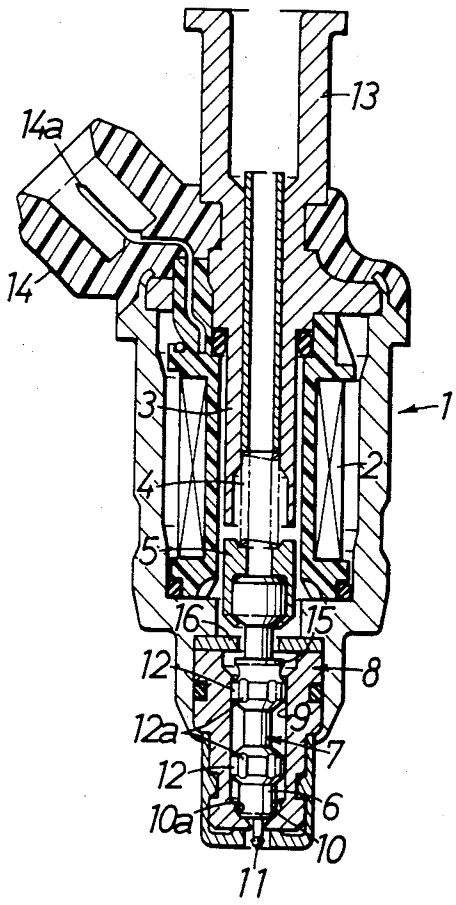
FIG. 2 is a sectional side view of a fuel injection valve in accordance with one embodiment of the present invention.

Referring to FIG. 2, therein is seen a main injection valve body 1 and an electromagnetic coil 2 disposed within the main valve body 1.

A fixed core 3 is provided within the electromagnetic coil 2, and a movable core 5 is also provided within the coil 2, in a forward portion thereof in the axial direction. A spring 4 acts on the movable core 5 to urge the core 5 away from fixed core 3. A valve rod 7 having an end with a valve body 6 is connected to the rear end of the movable core 5 and the valve rod 7 extends into a valve seat-forming member 8 attached to the end of the main valve body 1.

The valve seat-forming member 8 is provided with a guide bore 9 that extends in the axial direction, a valve seat 10 formed at the end of the guide bore 9 in continuation therefrom, and a fuel discharge port 11 in continuation from the valve seat 10. The valve rod 7 extends into the guide bore 9 such that a pair of increased diameter portions 12, which are provided with fuel passage grooves 12*a* along the outer peripheries thereof, can slide along the surface of the guide bore 9, whereby opening and closing displacement movements of the valve rod 7 are guided by the guide bore 9. The valve body 6 at the end of the valve rod 7 is normally pressed into contact with the seat surface 10a of the valve seat 10 by the spring 4. When electrical voltage is applied to the electromagnetic coil 2, the movable core 5 is magnetically attracted towards the fixed core 3 against the force of the spring 4, and the movement of the valve rod 7 in this instance releases the valve body 6 from the seat surface 10a, so that fuel from a socket portion 13 to a fuel conduit (not shown) is discharged from the fuel discharge port 11.

Reference numeral 14 in FIG. 2 denotes a plug socket equipped with a terminal 14a connected to the electromagnetic coil 2, and reference numerals 15 and 16 denote stops for limiting the displacement of the valve rod 7 in the valve opening direction.

Figure 1:
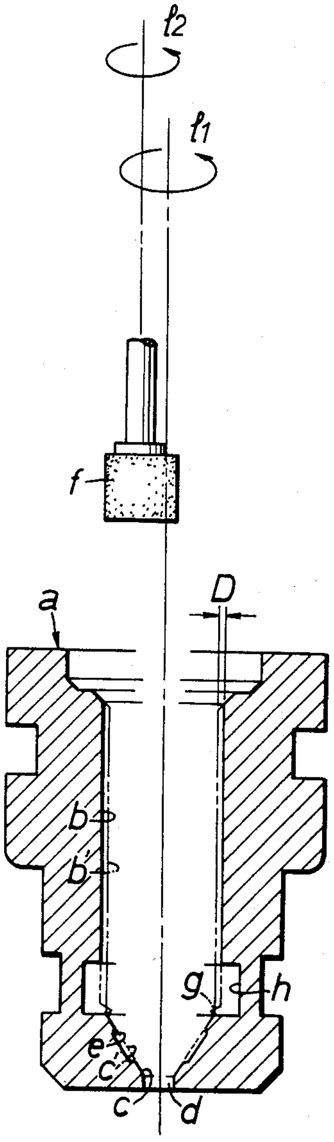
FIG. 1 PRIOR ART
FIG. 1 is a sectional side view of a valve seat-forming member in accordance with the prior art.
Figure 3:
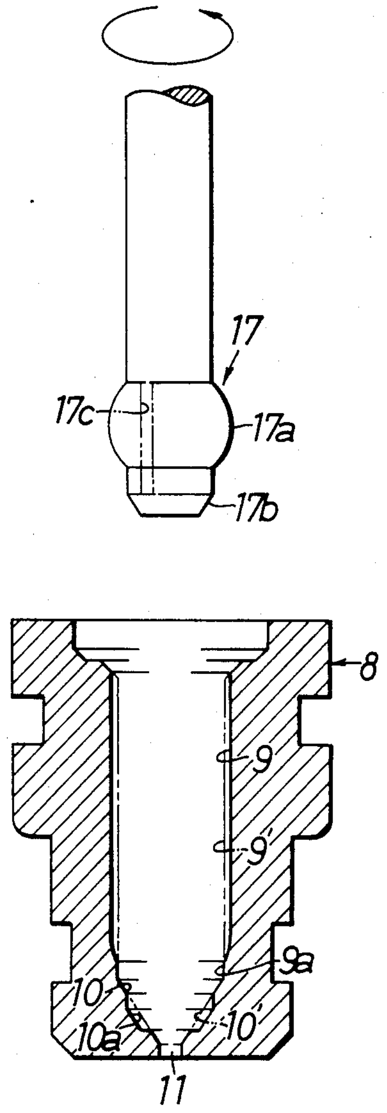
FIG. 3 is a sectional side view of the valve seat-forming member in accordance with the present invention.

The guide bore 9 of the valve seat-forming member 8 has the shape of a straight bore which is subjected to a burnishing in accordance with the characterizing feature of the present invention, but does not have any escape groove at its end. In more detail, the guide bore 9 is formed by subjecting the surface of a bore 9' which is bored in the blank of the valve seat-forming member 8, to a burnishing operation, as shown in FIG. 3 by a burnishing tool 17. This eliminates the necessity of cutting the escape groove, as explained in relation to the prior art valve in FIG. 1 whereby the formation of a polishing flashing is prevented, and makes it possible to obtain a fuel injection valve with a guide bore 9 which is straight and rectilinear without any escape groove.

As seen in FIG. 3, the burnishing tool 17 has integrally a first burnishing surface 17a for the guide bore 9 and a second burnishing surface 17b for the seat surface 10a, which is provided below, and concentrically with, the first burnishing surface 17a, so that the burnishing of the lower bore 10' of the valve seat portion 10 by the second burnishing surface 17b finishes the seat surface 10a simultaneously with the guide bore 9, and the producibility can thus be improved. Since there is only a single tool, concentricity can be easily assured for the guide bore 9 and the seat surface 10a, and the producibility of fuel injection valves of this kind can also be improved.

In the embodiment described above, the contact of the burnishing tool 17 with the end of the guide bore 9 is restricted so that a non-burnished portion 9a is left to project slightly inward. The portion 9a smoothly guides the flow of the fuel towards the fuel discharge port 11. According to this arrangement pressure losses can be reduced, and the fuel discharge characteristics can be further improved. Lubricant grooves 17c are formed, if necessary, at the burnishing surfaces 17a, 17b of the burnishing tool 17 in order to prevent seizure, as shown by the chain dotted lines in FIG. 3.

As described above, since the present invention provides a guide bore which has the same diameter over its length by burnishing, it eliminates the necessity of cutting an escape groove in the starting bore and the cleaning and swarf removal after cutting. Therefore, the producibility can be improved, and the occurrence of pressure losses, which would occur if the escape groove were present, is removed, thereby improving the fuel injection characteristics. Unlike the polishing finish, the present invention does not generate any polishing swarf (such as grinder particles and metal powder). Since the cutting of the escape groove can now be omitted, the deposition of residual foreign matter such as cutting swarf and grinding dust on the seat surface can be prevented, so that fuel leakage, closing of the fuel discharge port, and defects in the performance of the conventional fuel injection valve, such as changes in flow rate, arising from the deposition of foreign matter on the seat surface can be minimized. Although a burnishing tool is more expensive than grinding tools such as a grinding wheel, it has a much higher durability. Accordingly, the processing life of the burnishing tool is greater and the production cost is reduced.

Although the invention has been described in relation to a specific embodiment thereof, it will become apparent to those skilled in the art that numerous modifications and variations of the disclosed embodiment can be made within the scope and spirit of the invention as defined by the attached claims.

What is claimed is:

1. A method of producing a fuel injection valve which comprises a main fuel injection valve body; a valve rod slidable in said body and having an end with a valve body; and a valve seat-forming member attached to said main fuel injection valve body with said valve rod guidably received therein; said valve seat forming member having an interior including a guide bore for guiding opening and closing displacements of said valve rod, said guide bore having a uniform diameter throughout its entire length, a valve seat connected to said guide bore by an intermediate connecting portion, the valve seat having a smaller diameter than that of said guide bore and a fuel discharge port formed in continuation of said valve seat, said method comprising the steps of forming a starting bore in said valve seat-forming member by boring, the starting bore having a straight, rectilinear bore portion leading into a lower tapered bore portion, and thereafter concurrently forming said guide bore and said valve seat from said starting bore by simultaneously subjecting the surfaces of said straight, rectilinear portion and said lower tapered bore portion of said starting bore to a burnishing operation by a single and common burnishing tool leaving a non-burnished portion between the burnished guide bore and the burnished valve seat, said non-burnished portion forming said intermediate connecting portion which provides a smoothly stepped configuration from the guide bore to the valve seat.

2. The method according to claim 1, wherein said guide bore and said valve seat are formed so as to be connected without any undercut therebetween.

3. The method according to claim 1, wherein said guide bore and said valve seat are formed so as to be connected without flashing therebetween.

4. The method according to claim 1, wherein sid non-burnished portion is formed to project slightly radially inwards of said burnished guide bore.

5. The method according to claim 1, wherein said guide bore is burnished by a first burnishing surface of said tool and said valve seat is burnished by a second burnishing surface of said tool.

6. The method according to claim 5, wherein the second burnishing surface of the tool is below and concentric with the first burnishing surface.

7. The method according to claim 6 wherein the first burnishing surface has a rounded outwardly bulged outline in a longitudinal plane containing the axis of the tool.

8. A fuel injection valve which is obtained according to the method of claim 1.

* * * * *

UNITED STATES PATENT AND TRADEMARK OFFICE

CERTIFICATE OF CORRECTION

PATENT NO. : 4,651,926

DATED : March 24, 1987

INVENTOR(S) : Isamu Sasao et al.

It is certified that error appears in the above-identified patent and that said Letters Patent is hereby corrected as shown below:

On the title page, Item [73] should read:

-- [73] Assignees: Honda Giken Kogyo Kabushiki Kaisa, Tokyo, Japan and Kabushiki Kaisha Keihinseiki Seisakusho, Kawasaki-Shi, Japan --.

Signed and Sealed this

Fifth Day of January, 1988

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : 4,651,926

DATED : March 24, 1987

INVENTOR(S) : Isamu Sasao et al.

It is certified that error appears in the above-identified patent and that said Letters Patent is hereby corrected as shown below:

On the title page, Item [73] should read:

-- [73] Assignees: Honda Giken Kogyo Kabushiki Kaisha, Tokyo, Japan and Kabushiki Kaisha Keihinseiki Seisakusho, Kawasaki-Shi, Japan --.

This certificate supersedes Certificate of Correction issued January 5, 1988.

Signed and Sealed this

Fourteenth Day of March, 1989

Attest:

DONALD J. QUIGG

Attesting Officer

Commissioner of Patents and Trademarks